(12) United States Patent
Schwefer

(10) Patent No.: US 6,890,499 B2
(45) Date of Patent: May 10, 2005

(54) CATALYST FOR DECOMPOSING $N_2O$, ITS USE AND METHOD FOR THE PRODUCTION THEREOF

(75) Inventor: Meinhard Schwefer, Meschede (DE)

(73) Assignee: Uhde GmbH, Dortmund (DE)

(*) Notice: Subject to any disclaimer, the term of this patent is extended or adjusted under 35 U.S.C. 154(b) by 280 days.

(21) Appl. No.: 10/182,876

(22) PCT Filed: Feb. 7, 2001

(86) PCT No.: PCT/EP01/01307

§ 371 (c)(1),
(2), (4) Date: Jan. 28, 2003

(87) PCT Pub. No.: WO01/58570

PCT Pub. Date: Aug. 16, 2001

(65) Prior Publication Data

US 2003/0144142 A1 Jul. 31, 2003

(30) Foreign Application Priority Data

Feb. 11, 2000 (DE) .......................... 100 06 103

(51) Int. Cl.[7] .................. B01D 53/02; B01D 53/56; B01J 23/75; B01J 23/78
(52) U.S. Cl. ..................... 423/239.1; 502/328
(58) Field of Search ............... 423/239.1; 502/328

(56) References Cited

U.S. PATENT DOCUMENTS

| | | | |
|---|---|---|---|
| 3,806,582 A | * 4/1974 | Acres et al. | 423/239.1 |
| 4,053,556 A | * 10/1977 | Acres | 423/239.1 |
| 4,246,234 A | * 1/1981 | Kittrell et al. | 422/171 |
| 5,744,113 A | * 4/1998 | Hums | 423/239.1 |
| 6,500,398 B1 | * 12/2002 | Tagawa et al. | 422/171 |

FOREIGN PATENT DOCUMENTS

| | | | |
|---|---|---|---|
| DE | 19700490 | 7/1998 | |
| EP | 0362960 | 4/1990 | |
| FR | 2779360 A1 | * 12/1999 | B01D/53/56 |
| JP | 10165818 A | * 6/1998 | B01J/23/60 |
| WO | 00/13789 | 3/2000 | |

OTHER PUBLICATIONS

English language abstract of DE 19700490 (Derwent—1998).

English language abstract of WO200013789 (Derwent—2000).

* cited by examiner

Primary Examiner—Stanley S. Silverman
Assistant Examiner—Jonas N. Strickland
(74) Attorney, Agent, or Firm—Connolly Bove Lodge & Hutz LLP

(57) ABSTRACT

Catalyst for decomposing $N_2O$, its use, and process for its production

Figure 1:
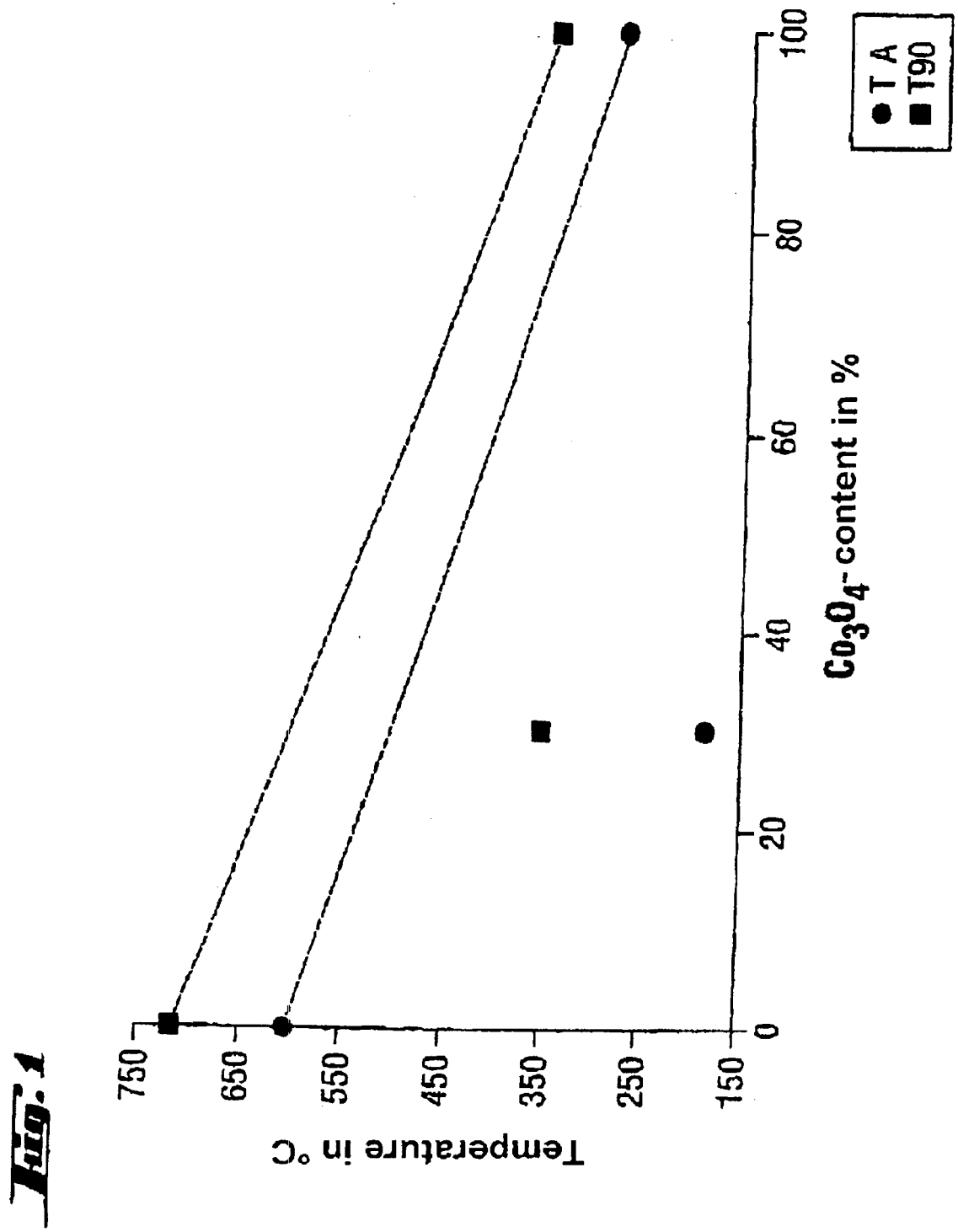

A process is described for the decomposition of $N_2O$ during nitric acid production by bringing the $N_2O$-containg waste gas leaving the absorption column into contact with a catalyst which comprises at least one oxidic cobalt compound and at least one oxidic magnesium compound, under conditions which permit conversion of $N_2O$ to gaseous nitrogen and oxygen. The content of oxidic cobalt compounds is in the range from 0.1 to 50% by weight and the content of oxidic magnesium compounds is in the range from 50 to 99.9% by weight, based in each case on the total weight of the catalyst, and at least 30% of the Co atoms present in the catalyst are present in the trivalent state.

The preparation of the catalyst involves dry mixing of the oxidic cobalt compounds and the oxidic magnesium compounds or of appropriate precursors which are converted into the oxidic compounds by heat treatment, and compacting the mix, with exclusion of water, so that the resultant catalyst has the desired envelope density.

20 Claims, 2 Drawing Sheets

CATALYST FOR DECOMPOSING N₂O, ITS USE AND METHOD FOR THE PRODUCTION THEREOF

Catalyst for decomposing $N_2O$, its use, and process for its production

The present invention relates to a process for decomposing $N_2O$ during nitric acid production, and to a catalyst for decomposing $N_2O$ and its preparation.

During ammonia oxidation in the course of nitric acid production, nitrous oxide $N_2O$, which is not desired, is produced alongside the desired nitrogen monoxide NO. $N_2O$ makes a considerable contribution to decomposing ozone in the stratosphere and to the greenhouse effect. After reduction of nitrous oxide emissions from the adipic acid industry, nitric acid production is the largest source of industrial nitrous oxide emissions. For environmental protection reasons there is therefore an urgent need for technical solutions for reducing nitrous oxide emissions during nitric acid production. Ullmann's Encyclopedia of Industrial Chemistry; Vol. A 17, VCH Weinheim (1991) gives an overview of the nitric acid production sequence and the various versions of that process.

One promising method of removing $N_2O$ from industrial waste gases is the decomposition of $N_2O$ into the elements nitrogen and oxygen, with the aid of a suitable catalyst.

There are numerous proposals for eliminating $N_2O$ during $HNO_3$ production, mostly based on catalytic decomposition of $N_2O$ between the Pt mesh and the first heat exchangers.

For example, U.S. Pat. No. 4,973,457 describes a process for eliminating dinitrogen oxide formed during $NH_3$ combustion, the method being retention of the gases for from 0.1 to 3 seconds prior to their cooling. According to the process which it describes, up to 90% of $N_2O$ is decomposed into $N_2$ and $O_2$. An alternative given is that the gases may also be brought into contact with a metallic or metal-oxide catalyst for selective decomposition and to reduce retention time.

DE-A-19 805 202 discloses a process for nitric acid production in which, to avoid release of nitrous oxide, the reaction gases downstream of the platinum mesh are passed, prior to cooling, over a heat-resistant catalyst for conversion of the $N_2O$ present in the reaction gases. This catalyst is exposed to extreme heat stress at from 800 to 1000° C., this being the temperature prevailing immediately after discharge of the reaction gases from the catalyst mesh. Preferred catalysts used are precious metals or ceramics.

DE-A-19819882 likewise describes a process for the catalytic decomposition of $N_2O$, in which the reaction gases from ammonia combustion are passed, prior to cooling, i.e. prior to contact with a heat exchanger, over a catalyst which is preferably composed of 8% by weight of CuO, 30% by weight of ZnO, and 62% by weight of $Al_2O_3$. The residence time for $N_2O$ decomposition is preferably <0.1 seconds.

U.S. Pat. No. 5,478,549 claims a process for preparing NO by oxidizing ammonia on catalysts of platinum group metals, in which the undesired $N_2O$ produced is first passed together with the reaction gas over a scavenger system to reclaim volatile platinum group metals, and then, to decompose $N_2O$, over a catalyst bed made from zirconium oxide. The temperature of the bed is to be $\geq 600°$ C.

An arrangement directly downstream of the Pt meshes therefore appears particularly desirable, since it is simply necessary to exchange the bed of Raschig rings downstream of the Pt meshes for an appropriate catalyst bed, or to install a simple apparatus to receive the catalyst below the meshes.

However, a disadvantage is the extreme conditions. Temperatures around 900° C., water contents in the range of 17%, and NO contents of 10% place high requirements not only on the activity and selectivity of the catalyst but also on its mechanical and thermal stability. In addition, the Pt burn-off from the Pt meshes can also precipitate on the catalyst bed and reduce selectivity of $N_2O$ decomposition by also causing decomposition of the desired oxidation product NO (Boudart et al., Journal of Catalysis 39, (1975), 383–394).

If appropriate catalysts are arranged in the residual gas which leaves the absorption column with a temperature of from 20 to 30° C., water content is restricted to from about 0.2 to 2%, depending on the version of the process, and $NO_x$ content is from 200 to 1000 ppm. The maximum temperature for the operation of this catalyst is prescribed by the respective inlet temperature for the residual gas turbine, and this limits the choice of suitable catalysts.

Of the numerous catalysts which have been demonstrated to be suitable in principle for decomposing and reducing nitrous oxide (Kapteijn et al.; Appl. Cat. B; Environmental 9 (1996), 25–64), and mention should be made, inter alia, of transition-metal-loaded zeolite catalysts (U.S. Pat. No. 5,171,553), the potential usefulness of which for reducing the amount of $N_2O$ during nitric acid production is also mentioned by Kapteijn.

The activity of iron-containing zeolites, e.g. Fe-ZSM-5, for decomposing $N_2O$ is increased in the presence of appropriate amounts of NO, and this is attributed to a reaction forming $NO_2$ by the route $NO+N_2O \rightarrow N_2+NO_2$, catalyzed by Fe-ZSM-5 (Kapteijn et al., Journal of Catalysis 167 (1997), 256–265).

In accordance with this theory it is pointed out that these catalysts could be used to eliminate $N_2O$ from the residual gas from nitric acid production, which comprises approximately equal parts of NO and $N_2O$. However, the practical use of these iron-containing and copper-containing zeolites is likely to be problematic, since the reference expressly points out that they are deactivated under hydrothermal conditions.

WO 99/34901 also relates to iron-containing zeolites based on ferrierite for the reduction of $N_2O$-containing gases. The catalysts used in that reference comprise from 80 to 90% of ferrierite, and also binders. The water content of the gases to be reduced is in the range from 0.5 to 5% by volume. In a comparison of various zeolite types, the best results for $N_2O$ decomposition (77% $N_2O$ decomposition at 400° C. in the presence of 1000 ppm of NO and and 3% of $H_2O$) were obtained with zeolites of FER (ferrierite) type.

In this instance the presence of $NO_x$ accelerates $N_2O$ decomposition, and therefore in order to achieve high $N_2O$ decomposition rates this catalyst is advantageously arranged in the residual gas from nitric acid production upstream of any DeNOx stage which reduces the NOx content of the waste gas. However, DeNOx stages in nitric acid plants are preferably operated using the SCR process (Selective Catalytic Reduction) with appropriate catalysts and $NH_3$ as reducing agent at temperatures in the range from 250 to 350° C. The upstream insertion of a catalyst for $N_2O$ decomposition, which operates at a temperature of about 400° C., is therefore not very rational from an economic point of view, since the waste gas which on leaving the absorbers initially has a temperature of about 30° C. would have to be heated to about 400° C. and then cooled to about 300° C.

It therefore appears preferable for the catalysts used in the waste gas from nitric acid production to decompose $N_2O$ not to require any activation by NO.

Examples of materials of this type are binary oxides, such as $Co_3O_4$ or NiO, the high activity of which for $N_2O$ decomposition is set out by Saito et al. in Actes du 2ieème Congrès International sur la Catalyse [Proceedings of the 2nd international conference on catalysis], Technip, Paris 1961, 1937–1953.

According to that reference, complete $N_2O$ decomposition is achieved even at about 360° C. over $Co_3O_4$. However, a disadvantage is the high price of these materials.

Actes du 2ième Congrès International sur la Catalyse, Technip, Paris 1961, 1937–1953 describes other binary oxides, e.g. $Al_2O_3$ or MgO, and their suitability for decomposing $N_2O$.

These oxides are less expensive than $Co_3O_4$, but have only poor activity for $N_2O$ decomposition. For example, complete $N_2O$ decomposition over MgO is not achieved until about 730° C. has been reached.

The literature also describes the introduction of specific Co compounds into appropriate low-cost matrices, or support on various support materials. However, the activities achieved are markedly lower than those of the pure Co components.

For example, when the $LaCoO_3$ described in Adv. Sci. Technol. (Faenza, Italy) (1999) 16, 585–592 is. introduced into a ceramic matrix (with 30% of LaCoO3 by weight) the temperature needed for complete decomposition of $N_2O$ is from 420 to about 650° C.

DE-A-19700490 claims a nitrous oxide decomposition catalyst which is composed of a mixture of $Co_3O_4$ and $La_{1-x}Cu_xCoO_{3-\delta}$ and which, in pure form, achieves complete $N_2O$ decomposition (starting from 2000 ppm of $N_2O$ in synthetic air) at a temperature as low as about 300° C. The introduction of this active component into a ceramic matrix, not specified in further detail, with 25% by weight of the active component shifts the reaction temperature for complete $N_2O$ decomposition to about 600° C., however.

U.S. Pat. No. 5,705,136 describes a process for decomposing nitrogen oxides based on catalysts which comprise mixed oxides of MgO and CoO, i.e. solid solutions of CoO in MgO (e.g. with a stoichiometric ratio of CoO/5MgO), or which comprise CoO applied to a support of MgO (e.g. MgO+10% CoO). By virtue of the nature of the preparation process, the manner of fixing the cobalt atoms here to the MgO support or incorporating them into the same is such that the cobalt here is present almost exclusively in the divalent state, this being expressly mentioned and confirmed in U.S. Pat. No. 5,705,136 and in Appl. Catal. B: Environmental 13 (1997) 69–79. The preferred usage range for these catalysts is from 500 to 700° C.

In the light of the known prior art, an object is therefore to provide, for $HNO_3$ production, a process which reduces the amount of $N_2O$ and permits a high level of decomposition of $N_2O$ at low temperatures, and can be integrated into the $HNO_3$ process without disadvantages to the technology of that process. This applies not only to the apparatus cost needed and associated with the installation of this process for reducing the amount of $N_2O$ but in particular also to any impairment of $HNO_3$ production, whether during operation under full load or during start-up or shut-down of production.

This object is achieved by the present invention, which relates to a process for decomposing $N_2O$ during nitric acid production by bringing the $N_2O$-containg waste gas leaving the absorption column into contact with a catalyst which comprises at least one oxidic cobalt compound and at least one oxidic magnesium compound, under conditions which permit conversion of $N_2O$ to gaseous nitrogen and oxygen, the content of oxidic cobalt compounds being in the range from 0.1 to 50% by weight and the content of oxidic magnesium compounds being in the range from 50 to 99.9% by weight, based in each case on the total weight of the catalyst.

The present invention also relates to a catalyst for the decomposition of $N_2O$ containing at least one oxidic magnesium compound and at least one oxidic cobalt compound. The content of oxidic cobalt compounds is in the range from 0.1 to 50% by weight, preferably from 5 to 35% by weight, and the content of oxidic magnesium compounds being in the range from 50 to 99.9% by weight, preferably from 65 to 95% by weight, based in each case on the total weight of the catalyst. The catalyst preferably has an envelope density in the range from 0.5 to 2.5 $g/cm^3$, based on an individual catalyst body.

The catalyst of the invention is a bulk catalyst.

The catalyst of the invention comprises cobalt compounds in which at least 30%, preferably more than 50%, of the Co atoms are present in the trivalent state. The and oxidic compounds of cobalt and magnesium are very substantially present in separate phases, and this can be demonstrated by appropriate X-ray diffraction experiments (XRD). The oxidation state of the cobalt may be detected with the aid of photoelectron spectroscopy (XPS).

The oxidic cobalt compound or, if two or more oxidic cobalt compounds are present, at least one of these preferably has perowskit or spinel structure. Examples of cobalt compounds which may be used according to the invention are $Co_3O_4$ or $LaCoO_3$. For the purposes of the invention use may also be made of appropriately doped compounds, e.g. $Cu_xCo_{3-x}O_4$ or $La_{1-x}Sr_xCoO_3$. The magnesium compound preferably used is MgO.

The substantial components of the catalyst, i.e. the oxidic compounds of magnesium and of trivalent cobalt, should have maximum specific surface area, in order to achieve maximum catalyst activity. The specific surface area of the oxidic cobalt compounds here is, depending on their nature and method of preparation, typically from 3 to 30 $m^2/g$, while the range for the oxidic Mg compound is from 20 to 200 $m^3/g$. The specific surface area of the finished catalyst is preferably in the range from 5 to 150 $m^2/g$.

The catalyst in the form of a cylindrical molding preferably has a radial compressive strength in the range from 0.5 to 10 MPa.

The composite catalysts of the invention have excellent activity for decomposing $N_2O$, indeed greater than the activity of the pure cobalt compound. This is illustrated in FIG. 1.

$T_{90}$, i.e. the temperature needed for 90% decomposition of $N_2O$, has been plotted, as has the minimum temperature ($T_A$) for $N_2O$ decomposition, against the $Co_3O_4$ content, based on catalyst weight. For comparison, the corresponding values for $N_2O$ decomposition over pure $Co_3O_4$ and pure MgO have also been shown (Actes du 2ième Congrès International sur la Catalyse, Technip, Paris 1961, 1937–1953).

The precise conditions of preparation and measurement are to be found in the examples given.

As can be clearly recognized, there is synergy in relation to $N_2O$ decomposition between oxidic compounds of trivalent cobalt and MgO. Instead of the expected proportional, i.e. linear, shape of the curves (broken lines) from $T_{90}$=715° C. for pure MgO (corresponding to 0% by volume of $Co_3O_4$) to $T_{90}$=350° C. for pure $Co_3O_4$, or from $T_A$=605° C. for pure MgO to $T_A$=280° C. for pure $Co_3O_4$, the $T_{90}$ value for the catalyst of the invention at 30% of $Co_3O_4$ is only 355° C., and the minimum temperature for the catalyst of the invention, $T_A=185°$ C., is indeed markedly lower than that of pure $Co_3O_4$.

This type of effect is not observed for solid solutions of of divalent cobalt oxide (CoO) in MgO, nor when MgO is used as support material. The temperatures needed for $N_2O$ decomposition are markedly higher than for the composite catalysts of the invention.

This high activity of the catalyst, permitting $N_2O$ decomposition of >80%, and its minimized sensitivity to water, permits its preferred use for the elimination of nitrous oxide from the waste gas from $HNO_3$ production. However, the use of the catalyst of the invention is not restricted to nitric acid production. The catalyst may be used anywhere where it is desired to decompose nitrous oxide from waste gases or process gases at relatively low temperatures. The catalyst of the invention may also be used downstream of gas turbines, for example.

Figure 2:
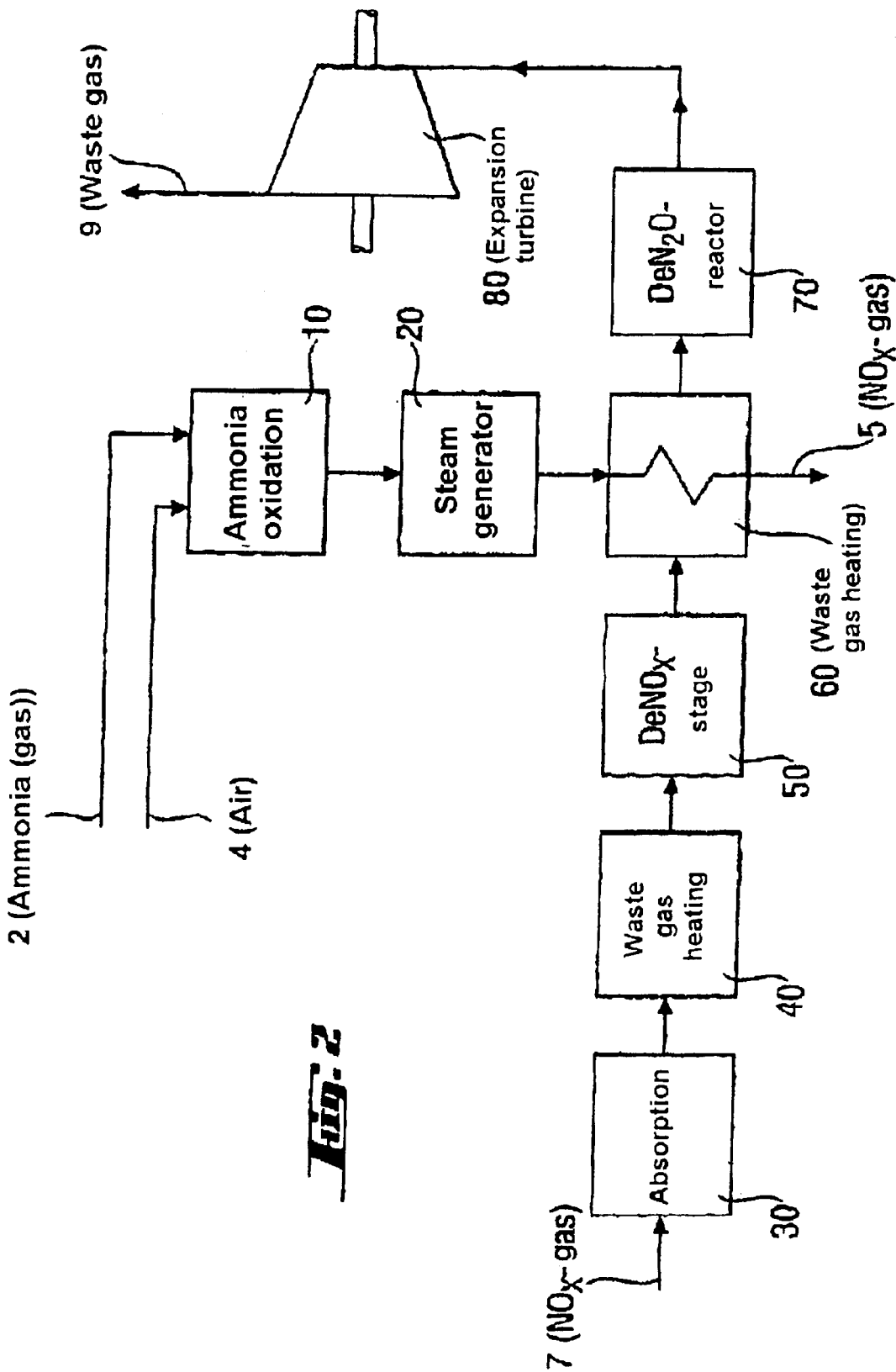

FIG. 2 illustrates a particularly advantageous arrangement for decomposition of nitrous oxide in nitric acid production, which is particularly advantageous since the $N_2O$-containing gas is passed at pressures of from 4 to 12 bara over the catalyst, and this reduces the amount of catalyst required, and secondly because the thermal energy needed for setting the desired operating temperature in the reactor can be reclaimed in the downstream expansion turbine.

The waste gas leaving the absorption column (30) in $HNO_3$ production is passed over the catalyst of the invention, which has been arranged in a reactor ($DeN_2O$ reactor) (70) upstream of the expansion turbine (80) in the direction of the process, in particular upstream of the expansion turbine (80) and downstream of a DeNOx stage (50).

If a DeNOx stage has previously been installed in the waste gas stream in order to reduce NOx content, the catalyst of the invention is to be installed downstream of this stage, since the presence of NOx inhibits $N_2O$ decomposition over this particular catalyst. Since the DeNOx stage, which is usually operated using the SCR process (Selective Catalytic Reduction) with $NH_3$ as reducing agent at temperatures of from 200 to 350° C., operates at lower temperatures than those needed to eliminate $N_2O$, the downstream installation of the reactor for $N_2O$ elimination permits the temperature level of the waste gas stream to rise from discharge from the absorber to entry into the expansion turbine. This is particularly advantageous for reasons of process technology.

The $N_2O$-containing waste gas stream is usually passed over the catalyst at temperatures in the range from 250 to 650° C., preferably in the range from 300 to 600° C.

If the temperature of the catalyst bed here has not been predetermined by the overall process, e.g. by the operation of the residual gas turbine installed downstream, it is usually selected in such a way as to achieve at least 90%, preferably at least 90%, particularly preferably more than 95%, by weight decomposition of $N_2O$ to $N_2$ and $O_2$.

The temperature needed for this purpose depends here firstly on the composition of the waste gas, which can vary depending on the version of the process used for $HNO_3$ production. For example, molecules of $H_2O$, NOx, or $O_2$ present in the gas stream inhibit $N_2O$ decomposition on cobalt-containing catalysts. If the proportions of these substances are high, the temperature has to be accordingly raised.

Secondly, the temperature needed for $N_2O$ decomposition depends on the selected residence time or space velocity, i.e. on the volume flow of the $N_2O$-containing gas passed over the catalyst, per unit of catalyst volume and per unit of time. As is known to the skilled worker, an increase in catalyst loading results in a corresponding increase in temperature if constant $N_2O$ decomposition rate is desired. At constant catalyst volume, an increase in the pressure, which is in the range from 4 to 12 bara, lengthens the residence time in the catalyst bed. Preferred space velocities are in the range from 2000 to 200,000 $h^{-1}$, in particular in the range from 5000 to 100,000 $h^{-1}$.

According to the invention, the heat of reaction of the $NH_3$ oxidation is used to set the operating temperature of the $DeN_2O$ reactor, and specifically via heat exchange between the waste gas stream entering into the $DeN_2O$ reactor and the hot process gases from $NH_3$ oxidation, as illustrated in FIG. 2. This is particularly advantageous, since it means that no additional heat, whether in the form of steam or electrical heating power, has to be imported into the $NHO_3$ process to operate the $DeN_2O$ reactor.

The advantages of the catalyst of the invention are also apparent during start-up and shutdown of $HNO_3$ production.

The minimized water-sensitivity of the catalyst permits not only long-term stability in the decomposition of $N_2O$ even from $H_2O$-containing waste gases at operating temperature, i.e. at temperatures of from 250 to 650° C., but also permits the catalyst to be brought into contact with water-containing waste gas even at low temperatures, well below the operating temperatures, as occurs during start-up and shutdown of $HNO_3$ production, with no resultant deactivation of the catalyst.

The procedure here is that the operating pressure in the plant is slowly brought up or, respectively, dissipated, but with no ammonia feed or ammonia oxidation. There is therefore no heat of reaction to heat the $DeN_2O$ reactor.

The process of the invention therefore permits efficient reduction of the amount of $N_2O$ in $NH\ O_3$ production without any need to undertake particular precautions or measures necessitated by the process for reducing the amount of $N_2O$, e.g. preheating to operating temperature or flushing with dry air during start-up or shutdown of production.

The present invention also provides a process for preparing the catalyst described above and comprising at least one oxidic cobalt compound and at least one oxidic magnesium compound, for the decomposition of $N_2O$ in $N_2O$-containing gases, characterized in that the preparation of the catalyst involves dry mixing of the oxidic cobalt compound and the oxidic magnesium compound or of appropriate precursors which are converted into the oxidic compounds by heat treatment, and compacting the flowable mix, with exclusion of water, so that the resultant catalyst has the desired envelope density, preferably an envelope density in the range from 0.5 to 2.5 $g/cm^3$, in particular from 1 to 2 $g/cm^3$, based on an individual catalyst body.

The inventive method of preparing the catalysts on an industrial scale, in particular the mixing of the components, and also the compaction or molding of the mix, ensures here that there will be long lasting activity in $N_2O$ decomposition, even in water-containing waste gas from nitric acid production, this being particularly important during start-up and shutdown of production.

The cobalt compounds used to prepare the catalyst of the invention are those in which at least 30%, preferably more than 50%, of the Co atoms are present in the the trivalent state, or else those compounds which in the course of the preparation and/or of the use of the catalyst are converted into cobalt compounds, e.g. by heat treatment in an oxygencontaining atmosphere, and then have just this content of trivalent cobalt.

Specific preparation processes known to the skilled worker (cf., for example, G. Ertl, H. Knözinger J. Weitkamp: Handbook of Heterogeneous Catalysis, Vol. 1, Chap. 2, VCH Weinheim (1997)) are used to prepare the Co component and Mg component. These are typically precipitation methods starting from salt solutions comprising Co ions or Mg ions, from which precipitation is brought about by adding basic precipitants. However, for the purposes of the invention the preparation may also proceed via solid-phase reaction or via simple decomposition of appropriate precursors, or via flame hydrolysis or flame pyrolysis.

In addition, the starting components for preparing the catalysts do not have to be processed in oxidic form. For example, it is also possible for appropriate precursors, e.g. carbonates, hydroxides, oxide hydrates, nitrates, or acetates of Mg or Co to be processed directly. The moldings produced are then heat-treated in a subsequent heat-treatment step at temperatures in the range from 200 to 700° C., preferably from 400 to 600° C., and thus converted into the oxidic state.

To achieve the properties described, during preparation of the catalyst care must always be taken that the components of the catalyst of the invention, i.e. the oxidic cobalt compound on the one hand and the oxidic magnesium compound on the other hand are present separately from one another in different chemical compounds, i.e. phases. For decomposition of the $N_2O$, the phases present in the composite have to be facing toward and accessible to the gas space comprising $N_2O$. There must be no occluding or blocking here of the one phase by the other, as occurs when an active component is applied to a support, e.g. of MgO, for example by precipitation or saturation, or were to be incorporated by kneading so as to be embedded into a support. The catalyst of the invention is a bulk catalyst. The participation of both active components (oxidic cobalt compound and oxidic magnesium compound) is essential for the activity of the catalyst.

Industrial preparation of the catalyst according to the invention has proven particularly advantageous for development of the synergy between the two catalyst components, and to minimize the sensitivity of the catalyst to water.

This applies in particular when using MgO as oxidic magnesium compound. Especially when the specific surface area is high, the MgO preferred for catalytic uses has pronounced susceptibility to hydration. The reaction of MgO with $H_2O$, which takes place on the MgO surface in accordance with the equation $MgO+H_2O \rightarrow Mg(OH)_2$, is in fact associated with a volume increase which in turn can lead to blocking of the catalyst pores, i.e. reduction of catalytic activity extending as far as mechanical breakdown of the catalyst bodies. Condensation of water on the catalyst surface, which, as a result of capillary condensation and depending on the porosity and pore size distribution of the catalyst, can even take place at temperatures well above the dew point of the free gas phase, amplifies this effect.

This occurs in particular when operations include the addition of water during the preparation of the catalyst, i.e. during the mixing of the oxidic cobalt. compound and MgO and the subsequent compaction and molding process. In this case, some of the magnesium oxide dissolves during processing and forms a finely distributed covering on the surface of the cobalt component. The hydration of this dispersed MgO occurs substantially more readily than crystalline MgO, i.e. MgO bound within a relatively large association of atoms, and blocks access to the Co component, and therefore leads to increased sensitivity of the catalyst to water.

Catalysts prepared in this way require particular care and precautions when used in water-containing waste gases.

This means that catalysts prepared via classic ceramic processing and molding processes, which usually includes mixing of the components with addition of water and then aqueous plastification and molding by extrusion, and which is specifically most widely used for the large-scale industrial preparation of catalysts for waste gas purification, have only limited suitability for use in nitric acid production.

For the inventive preparation of the catalyst, in particular its large-scale-industrial preparation, the oxidic compounds of cobalt and magnesium are therefore mixed dry in powder form. The subsequent compaction of the mix and molding to give moldings of the desired shape likewise take place with exclusion of water.

The mixing process, and also the compaction or molding of the mix, usually take place with addition of appropriate auxiliaries, such as binders or pressing aids, which are known to the skilled worker and which during thermal stressing of the catalyst, for example during burn-off of the added auxiliaries or during use of the catalyst, liberate no water or liberate only an amount of water such that no condensation of this water takes place in the catalyst, examples being graphite or talc.

The catalysts prepared by the process of the invention usually have a pore volume in the range from 0.1 to 0.8 ml/g, preferably from 0.2 to 0.65 ml/g.

Possible moldings are any of the usual catalyst shapes, preferably cylindrical moldings, e.g. hollow cylinders, or else star-shaped bodies, trilobes, etc., which have high available geometric surface area in comparison with their volume.

Various methods known to the skilled worker may be utilized for the dry compaction and molding process. One preferred process is dry pressing using a ram and die, but for the purposes of the invention it is also possible to compact with, for example, a roller compactor and then break and classify the compacted material. Dry extrusion, e.g. via toothed-wheel presses or roller presses, is also possible. For industrial preparation, particular preference is given to the use of automatic presses.

The pressures needed for the compaction or molding process depend on the assemblies used for this purpose, on the nature of the acidic compounds of cobalt and magnesium, and on the auxiliaries added, and also on the desired compaction or strength of the catalyst bodies. For the purposes of the invention, preference is given to compaction such that the finished catalyst has an envelope density of from 0.5 to 2.5 $g/cm^3$, in particular from 1 to 2 $g/cm^3$, based on an individual catalyst body.

Moldings of the catalyst prepared by the process of the invention, for example cylindrical moldings, usually have a radial compressive strength in the range from 0.5 to 10 MPa.

Although very high compactions usually lead to increased strength of the catalyst bodies, they impair accessibility of the individual components of the composite within the catalyst body. The catalyst of the invention must therefore always have high open porosity, ensuring accessibility of the individual components of the composite to the $N_2O$-containing gas. The total pore volume of the catalyst should be in the range from 0.1 to 0.8 ml/g, particularly in the range from 0.20 to 0.65 ml/g.

For the purposes of the invention, it is also possible to precompact the catalyst components, and precompaction may be necessary, for example, to produce flowable powder for purposes of automated charging of the press tooling. According to the invention, a particularly suitable method for this purpose is the separate slurrying and spray granulation of, on the one hand, the oxidic cobalt compounds and, on the other hand, the oxidic magnesium compounds, or of appropriate precursors. This may also take place with addition of appropriate auxiliaries, e.g. binders, plastifiers, or plasticizers, these being known to the skilled worker.

For the purposes of the invention, it is also possible to precompact the oxidic cobalt compounds and the oxidic magnesium compounds together, and in this case exclusion of water has to be ensured. Especially when MgO is used, aqueous slurrying and granulation of the starting components together is not a suitable method of preparing water-resistant catalysts.

Another constituent of the inventive preparation of the catalysts is heat-treatment steps, for example to burn off the added auxiliaries or to convert the cobalt compounds and magnesium compounds processed in the form of precursors into the corresponding oxides. Heat treatment is preferably a final step of catalyst preparation after the molding process at temperatures in the range from 200 to 700° C., preferably in the range from 400 to 600° C.

The selection of temperature for a possible heat-treatment step has to be such that there is no, or no substantial, resultant impairment of catalyst activity at the subsequent operating temperature. In selecting the temperature, care generally has to be taken that within the dry pressed material there is practically no sintering which could lead to ceramization of the dry molding.

The examples below are used to illustrate the invention.

EXAMPLES

Preparation of Catalyst

Preparation of Cobalt Component:

An aqueous solution of cobalt acetate was treated with an excess of sodium hydroxide solution. The resultant precipitate was filtered off, washed, and dried. After grinding of the dry product, this was slurried with addition of appropriate auxiliaries (plasticizers, stabilizers). Spray granulation of the slurry gave granules of average grain size 50 $\mu$m and bulk density 0.9 g/cm$^3$.

Preparation of Magnesium Component:

Magnesium carbonate was converted into magnesium oxide by calcining for a period of some hours, and then slurried with addition of appropriate auxiliaries (plasticizers, stabilizers). Spray-granulation of the slurry gave granules whose average grain size was 3 $\mu$m and whose bulk density was 0.6 g/cm$^3$.

Mixing of Components:

The starting components prepared in the above manner were dry-mixed with one another, with addition of graphite, and in a ratio such that the resultant oxide had a $Co_3O_4$/MgO ratio by weight of 3/7 after the subsequent heat treatment.

Pressing and Heat Treatment of Mix:

The mix was then pressed in an automatic press to give cylindrical moldings of dimensions d=3.5 mm and h=2.6 mm.

The resultant moldings were then heat-treated in air at 600° C. to burn off the added auxiliaries and to convert the cobalt component into $CO_3O_4$.

The compaction achieved (envelope density) was 1.4 g/cm$^3$, with a total pore volume of 390 cm$^3$/g. The radial compressive strength of the catalyst particle was 1.4 MPa.

Cobalt content, expressed in percent by weight, was 21%, based on the total weight of catalyst.

Use of Catalyst:

The specimen material for testing in the laboratory reactor was obtained by comminuting the catalyst bodies obtained by the above preparation process. The material was then introduced into a heatable flux reactor made from quartz glass, and brought into contact with a waste gas whose composition is typical for a waste gas from nitric acid production after NOx content has been reduced. The waste gas had the following composition: 2000 ppm by volume of $N_2O$, 2.5% by volume of $O_2$, 0.5% by volume of $H_2O$, remainder $N_2$.

$N_2O$ content was measured at the reactor inlet and reactor outlet with the aid of a FTIR spectrometer with high-pathlength cell.

Space velocity was 10,000 h$^{-1}$, based on a catalyst bed volume of 16 cm$^3$.

Under these conditions, 55% decomposition of $N_2O$ was achieved at 300° C. At 400° C., >99% of the $N_2O$ entering into the reactor was decomposed to give $N_2$ and $O_2$.

What is claimed is:

1. A process for decomposing $N_2O$ during nitric acid production by bringing the $N_2O$-containg waste gas leaving the absorption column into contact with a catalyst which comprises at least one oxidic cobalt compound and at least one oxidic magnesium compound, under conditions which permit conversion of $N_2O$ to gaseous nitrogen and oxygen, the content of oxidic cobalt compounds being in the range from 0.1 to 50% by weight and the content of oxidic magnesium compounds being in the range from 50 to 99.9% by weight, based in each case on the total weight of the catalyst, and at least 30% of the Co atoms present in the catalyst being present in the trivalent state.

2. The process as claimed in claim 1, characterized in that at least one of the cobalt compounds present in the catalyst has perowskit or spinel structure.

3. The process as claimed in claim 1, characterized in that the space velocity for the passage of the gas over the catalyst is from 2000 h$^{-1}$ to 200,000 h$^{-1}$.

4. The process as claimed in claim 1, characterized in that the pressure during passage of the gas over the catalyst is in the range from 4 to 12 bara.

5. The process as claimed in claim 1, characterized in that the catalyst has been arranged in a reactor in the waste gas stream upstream of the expansion turbine in the direction of the process.

6. The process as claimed in claim 5, characterized in that the catalyst has been arranged upstream of the expansion turbine and downstream of a DeNOx stage.

7. The process as claimed in claim 1, characterized in that the $N_2O$-containing gas is passed at temperatures in the range from 250 to 650° C. over the catalyst.

8. The process as claimed in claim 1, characterized in that the heat of reaction of the $NH_3$ oxidation is used to set the operating temperature of the reactor, via heat exchange between the waste gas stream entering into the reactor and the hot process gases from the $NH_3$ oxidation.

9. The process as claimed in claim 1, characterized in that at least 80% decomposition of $N_2O$ to give $N_2$ and $O_2$ is achieved.

10. A catalyst for the decomposition of $N_2O$ containing at least one oxidic magnesium compound and at least one oxidic cobalt compound, the content of oxidic cobalt compounds being in the range from 0.1 to 50% by weight and the content of oxidic magnesium compounds being in the range from 50 to 99.9% by weight, based in each case on the total weight of the catalyst, and at least 30% of the Co atoms present in the catalyst being present in the trivalent state.

11. The catalyst as claimed in claim 10, characterized in that the envelope density of the catalyst is 0.5 to 2.5 g/cm$^3$, based on an individual catalyst body.

12. The catalyst as claimed in claim 10, characterized in that the oxidic cobalt compounds and the oxidic magnesium compounds are present in separate phases.

13. The catalyst as claimed in claim 10, characterized in that the pore volume of the catalyst is in the range from 0.1 to 0.8 ml/g.

14. The catalyst as claimed in claim 10, characterized in that at least 50% of the Co atoms present in the catalyst are present in the trivalent state.

15. The catalyst as claimed in claim 10, characterized in that at least one of the cobalt compounds present in the catalyst has perowskit or spinel structure.

16. The catalyst as claimed in claim 10, characterized in that the catalyst has a specific surface area in the range from 5 to 150 m$^2$/g.

17. The catalyst as claimed in claim 10, characterized in that the catalyst is a cylindrical molding and has a radial compressive strength in the range from 0.5 to 10 MPa.

18. A process for preparing a catalyst as claimed in claim 10, where oxidic cobalt compounds and oxidic magnesium compounds or appropriate precursors which are converted into the oxidic compounds by heat treatment are mixed dry with one another to give a flowable mix, and the flowable mix is compacted, with exclusion of water, to give a molding, until the desired envelope density has been achieved.

19. The process for preparing a catalyst as claimed in claim 18, characterized in that the oxidic magnesium compounds and/or the oxidic cobalt compounds and/or the appropriate precursors which are converted into the oxidic compounds by heat treatment are transformed into flowable powders prior to the dry compaction via separate slurrying and separate spray granulation, the powders being suitable for automatic charging of the compaction assembly.

20. The process for preparing a catalyst as claimed in claim 18, characterized in that the resultant moldings are heat-treated at temperatures in the range from 200 to 700° C.

* * * * *